E. H. COWART.
ROTARY SPADING PLOW.
APPLICATION FILED JAN. 24, 1914.

1,122,481.

Patented Dec. 29, 1914.
2 SHEETS—SHEET 1.

WITNESSES:
F. M. Blanchard
J. B. Webster

INVENTOR.
Elias H. Cowart
BY
Perry S. Webster
ATTORNEY

E. H. COWART.
ROTARY SPADING PLOW.
APPLICATION FILED JAN. 24, 1914.
1,122,481.
Patented Dec. 29, 1914.
2 SHEETS—SHEET 2.
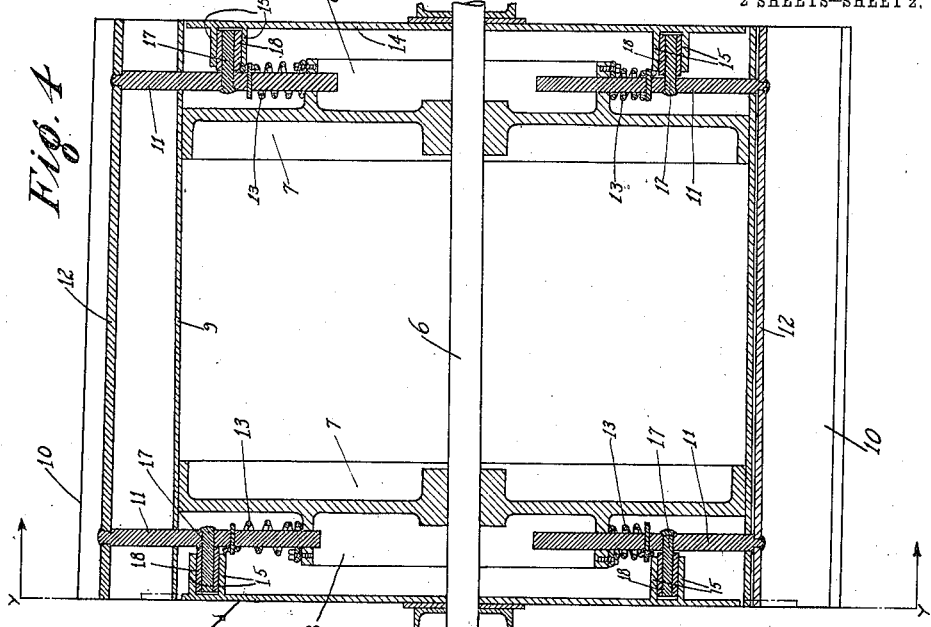
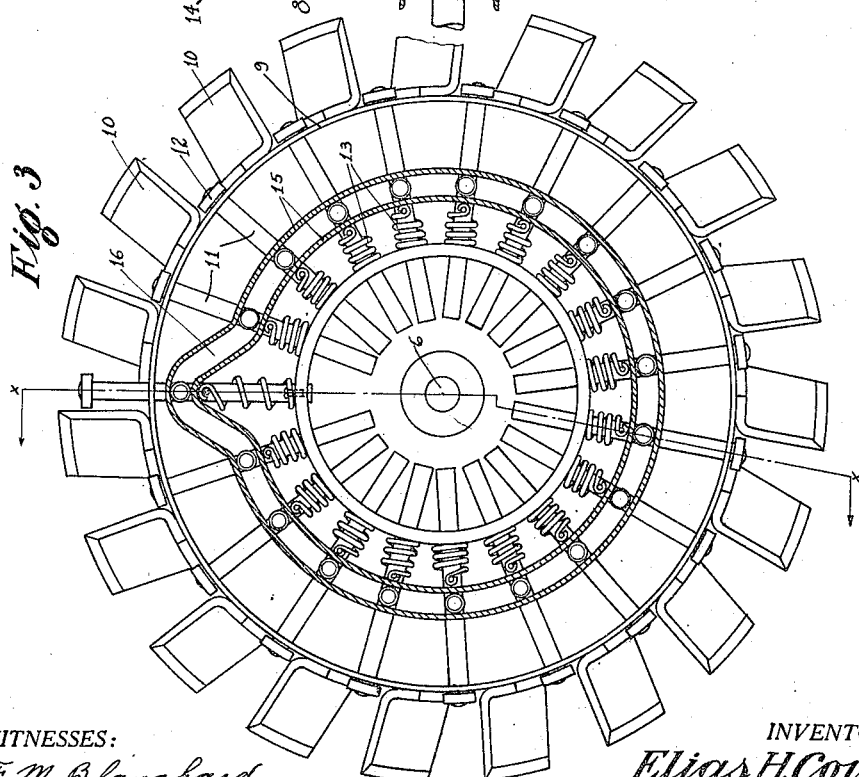
WITNESSES:
F. M. Blanchard
J. B. Webster
INVENTOR.
Elias H. Cowart
BY
Percy G. Webster
ATTORNEY

UNITED STATES PATENT OFFICE.

ELIAS HARDY COWART, OF SACRAMENTO, CALIFORNIA.

ROTARY SPADING-PLOW.

1,122,481.  Specification of Letters Patent.  Patented Dec. 29, 1914.

Application filed January 24, 1914. Serial No. 814,167.

*To all whom it may concern:*

Be it known that I, ELIAS H. COWART, a citizen of the United States, residing at Sacramento, in the county of Sacramento and State of California, have invented certain new and useful Improvements in Rotary Spading-Plows; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in plows used for tilling the soil, the object of the invention being to produce a rotary plow especially constructed for use in handling land covered with weeds, matted grass, tules or other foul matter.

The aim of the invention is to produce a spading plow which is so constructed with blades and cutters that after the foul matter has been previously matted directly in front of such blades or cutters, they will, with the operation of the plow, engage and cut through the foul matter prior to plowing into the dirt. Such blades or cutters will then carry the foul matter to a predetermined point at the rear of the plow where a discharging means will then discharge the same from the blades or cutters in order that it may be cut and chopped into a fine mass by other mechanism.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1:
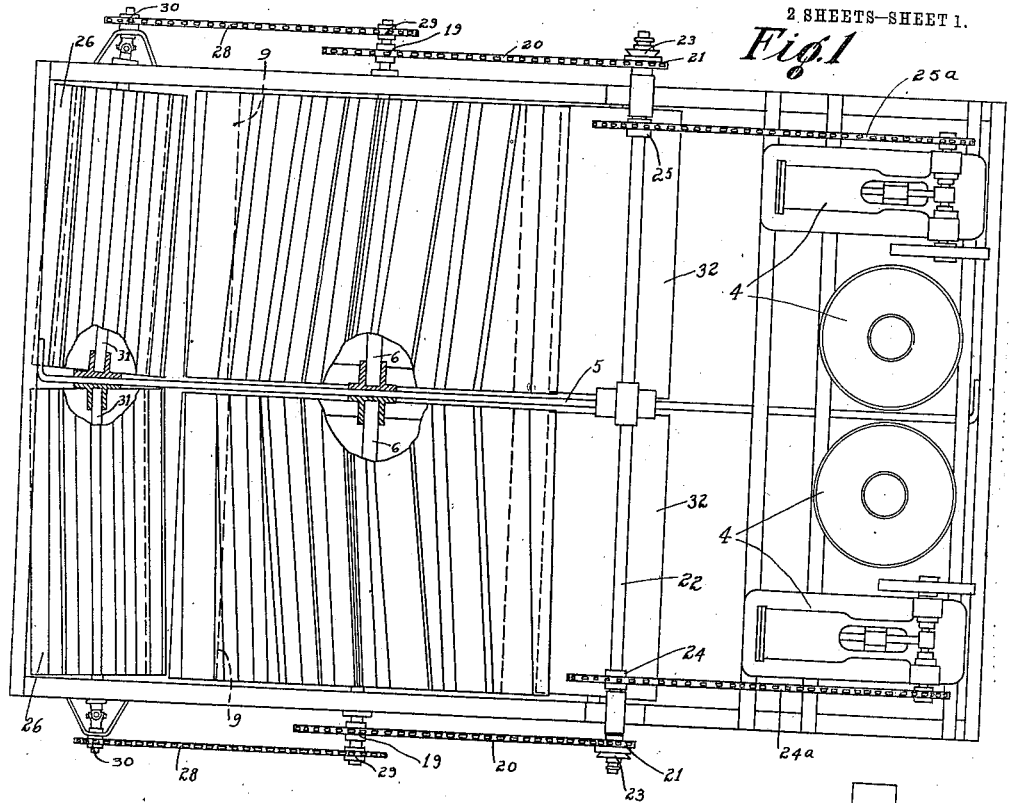
Figure 2:
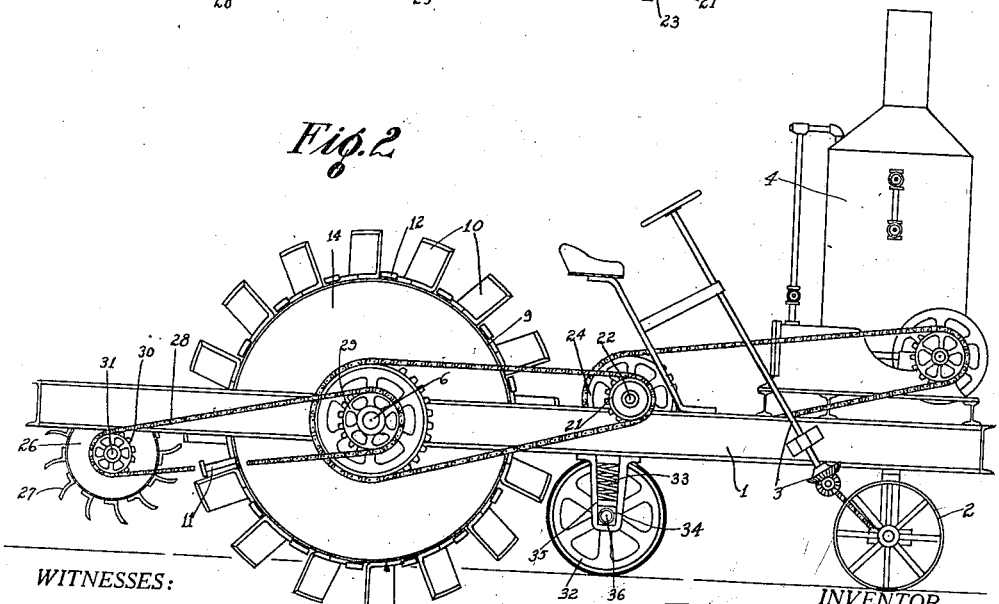

Figure 1 is a top plan view, partly broken out, of the complete structure. Fig. 2 is a side elevation of the same. Fig. 3 is a sectional view of one end of one of the plows taken relatively on a line Y—Y of Fig. 4. Fig. 4 is a sectional view of one of the complete plows taken relatively on a line X—X of Fig. 3.

Referring now more particularly to the characters of reference on the drawings, the numeral 1 designates the supporting frame which is suitably mounted on wheels 2 at the forward end and provided with any suitable steering mechanism 3 and with suitable motive power consisting of steam engines, explosive motors or any other suitable power, the kind here shown being steam engines 4, there being two of such engines for the purpose will presently appear.

The supporting frame 1 is divided by a central beam or bar 5 and journaled between each of the sides of the frame 1 and the bar 5 is a shaft 6 mounted on each of which is a plow comprising a pair of spaced disks 7 having outwardly projecting annular flanges 8. Secured to the outer periphery of the disks 7 is a suitable inclosing plate 9 projecting beyond the outside edges of the said disks 7 a suitable distance as shown. Secured to the outside of the plate 9 are a plurality of spaced spades or cutters 10 disposed in a slightly oblique manner with respect to the axis of the plow.

Projecting in a slidable manner through each of the flanges 8 and the plate 9 and adjacent each of the cutters 10 is a pair of push rods 11 provided on their outer ends with scraper plates 12 adapted to move over or adjacent the surfaces of the cutters 10 in order to clear such surfaces of such material as may adhere thereto during the plowing operation as will presently appear. The normal retracted position of the push rods 11 is maintained by retractile springs 13 secured to each of the rods 11 and to the flanges 8. The push rods 11 are adapted to be operated by means of the following structure, namely: Secured on frame 1—5 on each side of each plow in a rigid manner is a plate 14 provided with a slotted guide 15 following the circular contour of the plow for the greater portion of the distance thereof, but at one point making an abrupt eccentric curve as at 16. Each of the push rods 11 is provided with a transverse pin 17 having a sleeve 18 projecting into rolling contact with the slotted guide 15. Thus, as the plow revolves, each pair of the pins 11 will be driven outwardly once during each revolution of the plow when the rollers 18 thereon engage the abrupt eccentric curve 16, which action will drive the scraper plate 12 outwardly along the surface of one of the cutters 10 and clear the same of any material disposed thereon.

On the outer end of each of the shafts 6 is a sprocket wheel 19 connected by a chain 20 with a sprocket wheel 21 on a shaft 22 journaled on the frame 1. The connection of each of the gears 21 with said shaft 22 is made by means of a friction clutch 23 for the purpose of allowing a differential action, if desired, in going around curves or similar places. On the shaft 22 is a pair of spaced gears 24 and 25, each being connected by a chain 24ª and 25ª respectively, with one of the motive means 4 by means of which gear and chain connections the said plows will be operated, the forward motion of the entire device being imparted by the movement of the plows, the suitable tractive power being due to the weight of the machine on said plows.

Mounted at the rear of each plow member and capable of rotary montion is a drum 26 provided with a plurality of projecting cutter blades 27 disposed closely adjacent the members 10. Motion is imparted to the members 26 by means of chains 28 connecting sprocket gears 29 on the shaft 6 with sprocket gears 30 on the shaft 31 of such members 26. Mounted on the underside of the frame 1 directly in front of each plow member is a roller 32 held in contact with the ground surface by means of expansible springs 33 interposed between the frame 1 and journaled boxes 34 movable in guides 35 in which boxes 34 are the shafts 36 of the said rollers 32.

The operation is as follows, namely: With the action of the motive means, the plow members are rotated and the plates or cutters 10 dig into the ground forming the traction to move the vehicle forward. The rollers 32 first roll the weeds, matted grass, tules or other foul matter in a flat condition immediately in the path of the plows and the said plates or cutters 10 then cut through the same and into the earth in an efficient manner. Upon leaving the earth said foul matter will probably adhere to the cutters 10, but just as such cutters reach a point adjacent the blades 27, the push rods 11 are moved outwardly causing the scraper plate 12 to move over the surface of the cutter 10 thus clearing the same and the blades 27, which will be revolved in a rapid manner with the members 26, thoroughly break up and cut such matter into fine parts, removing it as an impediment to the skilful and efficient plowing and tilling of the soil.

From the foregoing description it will readily be seen that I have produced such a device as substantially fulfils the objects of the invention as substantially set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

A device of the character described comprising the combination with a separating frame, of a rotary member mounted thereon, a plate fixed to said frame on each side of said rotary member, a slotted guide member projecting from each plate, such guide members being concentric with the axis of said rotary member for a greater portion of their length and being at one point eccentric with such axis, projecting flange members on each side of said rotary member, such flange members being concentric with the axis of such rotary member, a plurality of push rods movable through such flange members and the outer rim of said rotary member, each push rod having a roller movable in one of said guides, springs seated against said flange members and each connected with one of said push rods, projecting blades on said rotary member and scraper plates mounted on said push rods and movable over said blades, as described.

In testimony whereof I affix my signature in presence of two witnesses.

ELIAS HARDY COWART.

Witnesses:
JOSHUA B. WEBSTER,
FLOYD M. BLANCHARD.